United States Patent [19]

Martinez Vera et al.

[11] 4,216,011
[45] Aug. 5, 1980

[54] METHOD AND APPARATUS FOR THE SECONDARY GASEOUS REDUCTION OF METAL ORES

[75] Inventors: Enrique R. Martinez Vera, Monterrey; Jorge O. Becerra Novoa, San Pedro Garza Garcia, both of Mexico

[73] Assignee: Hylsa, S.A., Monterrey, Mexico

[21] Appl. No.: 32,665

[22] Filed: Apr. 23, 1979

[51] Int. Cl.² ........................................... C21B 13/02
[52] U.S. Cl. ........................................... 75/91; 75/35; 75/72; 75/82; 75/85; 266/156
[58] Field of Search .................... 75/34, 35, 26, 91, 82, 75/72, 85; 266/197, 156; 75/0.5 B, 0.5 BA

[56] References Cited

U.S. PATENT DOCUMENTS

| | | | |
|---|---|---|---|
| 2,740,706 | 4/1956 | Paull et al. | 75/35 |
| 3,147,106 | 9/1964 | Johnson et al. | 75/0.5 BA |
| 3,385,694 | 5/1968 | Josefsson et al. | 75/0.5 BA |
| 3,637,368 | 1/1971 | Bessant | 75/34 |
| 3,732,092 | 5/1973 | Wieland et al. | 75/0.5 BA |
| 3,788,835 | 1/1974 | Lewis et al. | 75/34 |
| 3,887,402 | 6/1975 | Kondo et al. | 75/0.5 BA |
| 4,017,305 | 4/1977 | Waslo et al. | 75/34 |
| 4,150,972 | 4/1979 | Price-Falcan | 75/35 |

Primary Examiner—M. J. Andrews
Attorney, Agent, or Firm—Curtis, Morris & Safford

[57] ABSTRACT

A method and apparatus are disclosed for achieving improved reduction efficiency and thermal economy in the reduction of particulate metal ores, e.g., iron ore, in a vertical shaft, moving bed reactor. The reactor consists of a primary reduction zone, a cooling zone and a secondary reduction zone located between the primary reduction zone and the cooling zone wherein ferric carbide formed in the primary reduction zone further reduces the residual iron oxide in the presence of an inert gas at a temperature below the melting point of the sponge iron. In one embodiment of the invention the gas produced by the reaction in the secondary reduction zone is withdrawn into a combustion chamber where it is mixed with air and burned, carbon dioxide is removed from the effluent gas of the combustion chamber and the remaining inert gas is recirculated to the secondary reduction zone. In another embodiment of the invention inert gas is supplied from an external source and carbon dioxide is eliminated from the system by means of a controlled purge. Use of the disclosed secondary reduction system allows for a lower residence time of the metal ore through the reactor and increased thermal economy.

18 Claims, 3 Drawing Figures

METHOD AND APPARATUS FOR THE SECONDARY GASEOUS REDUCTION OF METAL ORES

BACKGROUND OF THE INVENTION

This invention relates to the gaseous reduction of particulate ores to metals in particulate form in a moving bed, vertical shaft reactor, and more particularly, to a method and apparatus for controlling the reduction of the ore and the cooling of the resulting metal particles. In the following description the process is illustratively described as applied to the reduction of iron ore to sponge iron. However, as the description proceeds it will be evident to those skilled in the art that the invention is also applicable to the treatment of ores other than iron ore.

In general, the production of sponge iron in a vertical shaft, moving bed reactor involves two principal steps, namely, reduction of the ore with a suitable hot reducing gas in a reduction zone of the reactor and then subsequent cooling of the resulting sponge iron with a gaseous coolant in a cooling zone of the reactor. The reducing gas is typically a gas largely composed of carbon monoxide and hydrogen at temperatures of the order of 850° C. to 1100° C., preferably 900° C. to 1000° C. The hot reducing gas is usually introduced at the bottom of the reduction zone and passed upwardly through the reactor to reduce the metal ore. In a number of previously proposed processes, cooling of the sponge iron is effected by passing a portion of the reducing gas at relatively low temperature upwardly through the cooling zone of the reactor whereby the reducing gas temperature is increased and the temperature of the sponge iron is reduced.

The sponge iron product is commonly used as the charge, or part of the charge, to an electric steel-making furnace. It has been found that when used for this purpose carburization of the sponge iron is desired. Carburization of the metal-bearing material in the reduction zone is achieved when a carbon-containing reducing gas is passed thereover. The product of the carburization process is primarily ferric carbide ($Fe_3C$) in which the carbon is in an especially suitable form for reaction with residual iron oxide (FeO) to produce sponge iron with a higher metallization.

In previously proposed processes this reaction between ferric carbide and residual amounts of iron oxide in the sponge iron has been accomplished in an electric steel-making furnace to which the sponge iron is charged after leaving the reactor. The amount of effort required to achieve a given degree of metallization increases relatively rapidly as the metallization approaches 100%. A metallization of up to about 85% can be obtained rather easily but in order to achieve higher metallizations up to say 95% to 98%, the residence time of the metal-bearing material in the reduction zone must be increased and higher gas temperatures must be used. As the residence time in a given size of reactor is increased, its productivity declines. Also since the effluent gas from the reduction zone must be cooled and de-watered before being reheated and recycled, the requirement that the inlet reducing gas be at a higher temperature results in greater heat losses and a lowered thermal economy. Moreover, if higher temperatures are used, there is a danger that the iron particles might sinter thereby interfering with the smooth flow of the particulate material through the reactor.

A need exists for a moving bed reactor system which will produce highly metallized and low-carbon sponge iron without a corresponding increase in the residence time through the reactor which would result in a reduction of the production rate. Sponge iron having a high metallization and low-carbon content can be used not only in the conventional electric steel-making furnace, but also for making steel in Cupola furnaces and as a raw material in the production of iron powders. The iron powder has a number of important applications including use in the fabrication of automotive and machinery parts, welding electrodes, parts for electric equipment and medicine.

SUMMARY OF THE INVENTION

It is accordingly an object of the present invention to provide a metal ore reduction process by which a metal ore, e.g., iron ore, can be reduced to sponge metal, e.g., sponge iron, of high metallization in a vertical shaft reactor with improved productivity and thermal economy. It is another object of the invention to provide a method and apparatus for the gaseous reduction of metal ores in a vertical shaft, moving bed, ore reduction reactor wherein improved productivity and thermal efficiency are achieved by carrying out the final portion of the metallization in a secondary reduction zone. It is still a further object of the invention to provide an economical source of a substantially inert gas at a relatively low temperature to be supplied to the secondary reduction zone in order to promote the further reduction of residual iron oxide by the solid phase reaction of ferric carbide and iron oxide. It is another object of the invention to provide a method and apparatus for inert gas generation integrated with the reactor to supply substantially inert gas to both the secondary reduction and cooling zones. Other objects of the invention will be in part obvious and in part pointed out hereafter.

The objects and advantages of the present invention may be achieved, in general, through the use of two reduction zons, i.e., a primary and secondary reduction zone. In the primary zone the iron ore is reduced by a hot reducing gas to a moderately high metallization, e.g., 85%. and a desired amount of the reduced ore is controllably carburized to form ferric carbide. In the second zone the ferric carbide is then caused to react with residual iron oxide in an inert atmosphere, preferably nitrogen, to form a highly metallized sponge iron of relatively low carbon content. The solid phase reaction between ferric carbide and residual iron oxide forms carbon monoxide in accordance with the equation:

$$FeO + Fe_3C \rightarrow CO + 4Fe$$

In one embodiment gas flows to a combustion chamber where it is burned with air to form carbon dioxide. The carbon dioxide is removed and the remaining substantially inert gas is recycled back to both the secondary reduction and cooling zones.

While it is true that a solid phase reaction between ferric carbide and residual iron oxide is broadly known and has previously been disclosed, for example, in Lewis et al. U.S. Pat. No. 3,788,835, neither the utilization of this reaction in a moving bed reactor system for the direct reduction of ore to produce sponge iron, nor the use of an inert gas loop as disclosed in the present application, is shown in the Lewis patent. The Lewis et al. patent deals with a fluidized bed reactor which is quite different from the moving bed reactor of the present invention.

The many objects and advantages of the present invention can best be understood and appreciated by reference to the accompanying drawings which illustrate sponge iron production systems incorporating several embodiments of the apparatus invention, which apparatus is capable of being used to carry out the method of the invention.

DETAILED DESCRIPTION OF THE DRAWINGS

Figure 1:
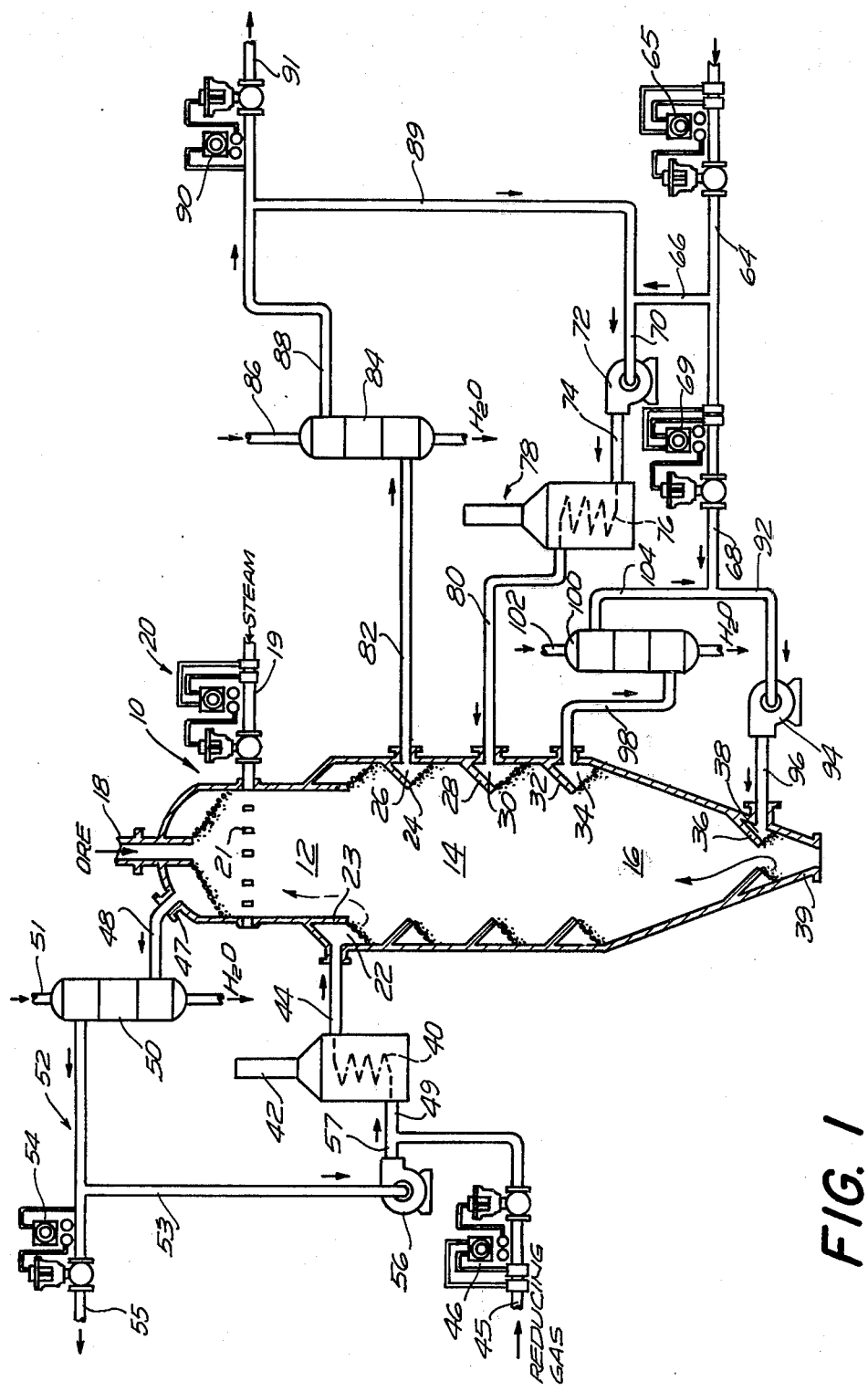
FIG. 1 illustrates diagrammatically a sponge iron production system which compries a vertical shaft reactor having a secondary reduction zone located between the reducing and cooling zones thereof.

Referring to the drawings, and particularly FIG. 1, numeral 10 generally designates a vertical shaft, moving bed reactor having a primary reduction zone 12 in the upper portion thereof, a cooling zone 16 in the lower portion, and a secondary reduction zone 14 located between the primary reduction and cooling zones. The reactor 10 is suitably heat insulated and interiorly lined with a refractory material in a manner known in the art.

The particulate ore which is to be treated is introduced into the reactor 10 through a charging pipe 18. The ore charged to the reactor may be in the form of either lumps or preformed pellets or mixtures thereof. Near the bottom of the primary reduction zone 12 the reactor is provided with an annular plenum chamber 22 which extends around the periphery of the reactor and provides a means whereby reducing gas may be fed to the reactor. There is also a vertical baffle 23 which together with the wall of the reactor defines the annular space 22. The ore moves downwardly through the primary reduction zone wherein it is largely reduced to sponge iron by upwardly flowing reducing gas. Steam may be injected into the primary reduction zone through inlet pipe 19 at a rate controlled by the flow controller 20 and then through spargers 21 to control the carburization of the metalbearing material.

The largely reduced iron ore leaving the primary reduction zone 12 and entering the secondary reduction zone 14 will essentially consist of elemental iron, ferric carbide and residual amounts of ferric oxide. Near the bottom of the secondary reduction zone 14 there is another annular plenum chamber 30, similar to plenum chamber 22, through which substantially inert gas may be fed into the reactor. A frusto-conical baffle 28 is also provided which together with the wall of the reactor defines the annular space 30.

The partially reduced iron ore moving downwardly through the secondary reduction zone 14 will undergo further reduction in an inert gas atmosphere. Inert gas may be supplied to the secondary reduction zone 14, either directly through pipe 66 or by inert gas flowing upwardly from the cooling zone 16. The ferric carbide produced in the primary reduction zone 12 will further reduce the residual ferric oxide in the ore entering the secondary reduction zone 14. The residual ferric oxide is reduced through a solid phase reaction with the ferric carbide. The solid phase reaction also produces carbon monoxide which flows upwardly through the secondary reduction zone 14 and leaves the reactor through annular plenum chamber 26. The plenum chamber 26 and the frusto-conical baffle 24 are similar to plenum chamber 30 and baffle 28.

As a result of the further reduction achieved in the secondary reduction zone, the ore leaving this zone and entering the cooling zone 16 will be highly metallized and of low carbon content. Near the bottom of the cooling zone 16 there is another annular plenum chamber 38 through which predominantly inert cooling gas is fed into the reactor. A frusto-conical baffle 36 is also provided similar to baffle 28. The sponge iron flows downwardly through the cooling zone 16 wherein it is cooled by the cooling gas flowing therethrough and leaves the reactor through outlet pipe 39.

Turning now to the gas flows in the present system, fresh reducing gas largely composed of carbon monoxide and hydrogen enters the system (from a suitable source not shown)through pipe 45 at a rate controlled by the flow controller 46. The reducing gas may be generated, for example, by partial combustion of fuels, by coal gasification, or by the catalytic reforming of hydrocarbons and steam. Other known types of reducing gas, e.g., coke oven gas, may be used in place of reformed natural gas or any of the other previously mentioned sources of reducing gas.

Gas entering the system through pipe 45 flows into pipe 49 and then to a heating coil 40 of a heater 42 wherein it is heated to a temperature of about 750° to 1100° C., preferably 850° to 950° C. The hot gas exits from heater 42 through pipe 44 and flows into the plenum chamber 22. The gas flows through plenum chamber 22 and into the reactor near the bottom of the primary reduction zone 12. Upon entering the reactor, the gas flows upwardly through the primary reduction zone, effects a partial reduction of the ore in the primary reduction zone and is removed near the top of the reactor through a discharge connection 47 and pipe 48.

The gas leaving the reactor through pipe 48 enters a quench cooler 50 into which water is introduced through pipe 51 to cool and effectuate the removal of water in the effluent gas. The gas exits from cooler 50 through pipe 52 and flows into pipe 53 which connects with the suction side of pump 56. The gas mixture flowing to pump 56 is discharged through pipe 57, joins with the fresh reducing gas from pipe 45 and is then recycled to the reactor through pipe 49, heater 42, pipe 44 and plenum chamber 22. A portion of the gas steam flowing through pipe 52 may flow through pipe 55 to a suitable point of use not shown. Pipe 55 is provided with a back pressure regualtor 54 having an adjustable set point so that it may be adjusted to maintain a desired positive and constant pressure in the system to improve the efficiency of reactor 10.

Referring now to the right-hand portion of FIG. 1, inert make-up gas, preferably nitrogen, may be supplied from a suitable source (not shown) through pipe 64 at a rate controlled by the flow controller 65. Inert gas entering the system through pipe 64 is divided and a portion thereof flows through pipe 66 to an inert gas loop which supplies the secondary reduction zone with substantially inert gas while the remainder of the entering make-up gas flows through pipe 68 having a flow controller 69 to a cooling gas loop of the system. More particularly, entering inert gas flows through pipe 66 into pipe 70 and then into the suction side of pump 72. The gas is then discharged by pump 72 through pipe 74 and into a heating coil 76 in heater 78. The gas entering heater 78 is heated to some temperature in excess of about 500° C. and preferably in the range of 600° to 900° C. The heated gas exits from heater 78 and flows through pipe 80 into plenum chamber 30 through which it then enters the reactor near the bottom of the secondary reduction zone 14.

The substantially inert hot gas entering the secondary reduction zone creates a favorable environment for the further reduction of residual ferric oxide in the ore. When the ferric oxide is reduced by the ferric carbide through the solid phase reaction previously disclosed, carbon monoxide is also formed. The carbon monoxide so formed and the substantially inert gas flow upwardly through the secondary reduction zone 14 to plenum chamber 26 through which they exit from the reactor. The combined gas stream leaves the reactor through pipe 82 and enters a quench cooler 84 into which water is introduced through pipe 86 to cool the effluent gas. The gas stream exits from cooler 84 through pipe 88 and then pipe 89 after which it combines with the inert make-up gas from pipe 66 to enter pipe 70 and then the suction side of pump 72. This combined gas stream is then recycled through pipe 74, heater 78, pipe 80 and plenum chamber 30 to enter the secondary reduction zone 14. A portion of the gas flowing through pipe 88 may flow through pipe 91 to a vent stack or other suitable point of disposal (not shown). Pipe 91 is provided with a back pressure regulator 90 having an adjustable set point so that it may be adjusted to maintain a desired positive and constant pressure in the secondary reduction zone.

The gas flows through the gas loop including the primary reduction zone and the gas loop including the secondary reduction zone can be independently controlled so as to minimize any contamination of the reducing gas by the substantially inert gas and vice-versa as described in U.S. Pat. No. 3,765,872.

A portion of the inert make-up gas entering the system through pipe 64 also flows through pipe 68 to the cooling loop. The gas flows from pipe 68 into pipe 92 and then to the suction side of pump 94. The cooling gas is discharged from pump 94 through pipe 96 and enters the cooling zone 16 of the reactor through plenum chamber 38. The inert cooling gas flows upwardly through the cooling zone 16 thereby cooling the sponge iron bed moving downwardly through the reactor.

The cooling gas leaves the reactor through plenum chamber 34 and pipe 98. The gas then enters quench cooler 100 into which water is introduced through pipe 102 to cool the effluent gas stream. The gas stream then exits from quench cooler 100 through pipe 104 and combines with inert make-up gas from pipe 68 and is then recycled through pipe 92, pump 94, pipe 96 and plenum chamber 38 to the bottom of the cooling zone 16 of the reactor.

Figure 2:
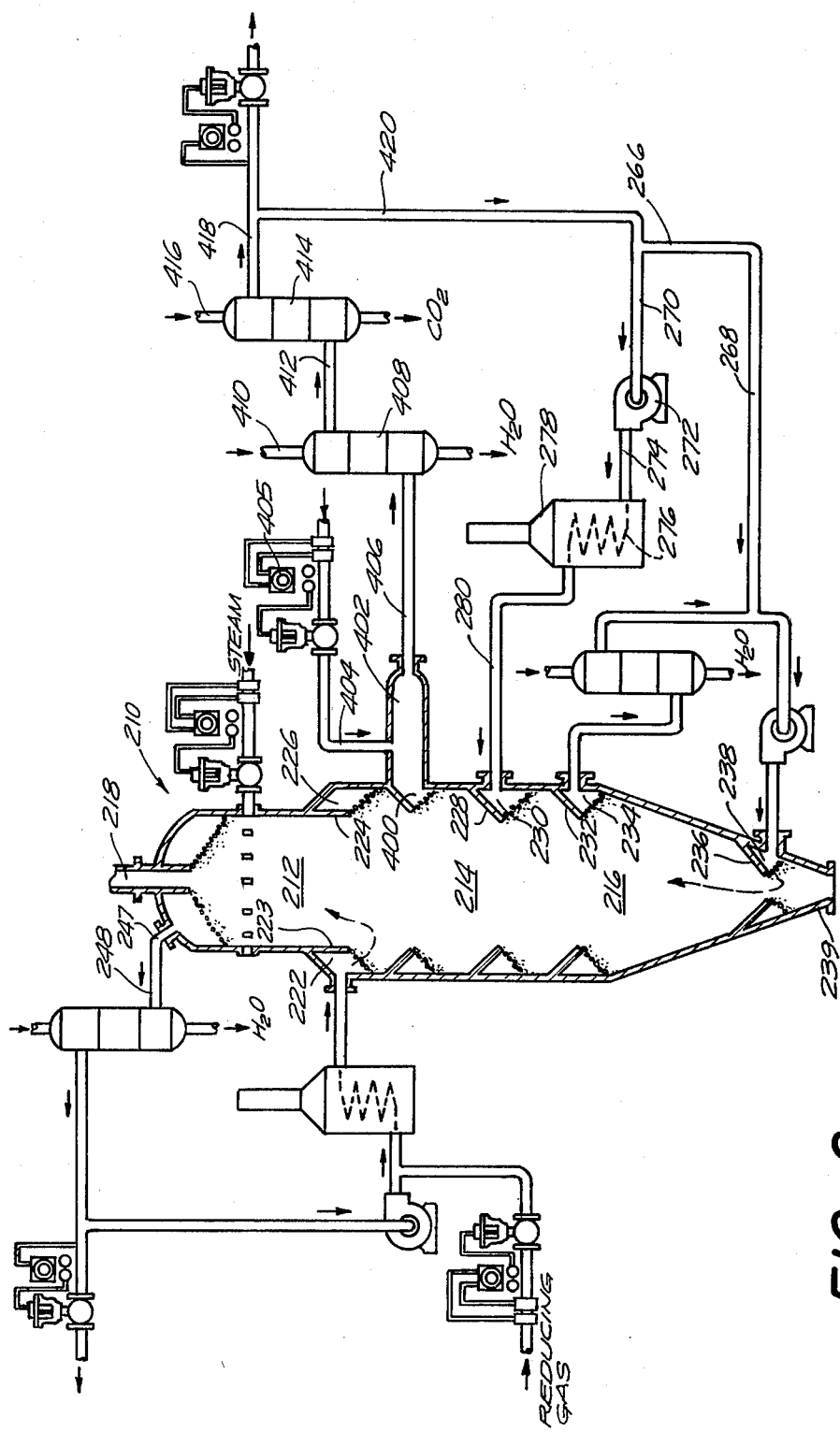
FIG. 2 illustrates a similar system wherein the combustible components of the gas stream leaving the secondary reduction zone are burned in a combustion chamber and then treated so as to remove carbon dioxide.

Turning now to FIG. 2 of the drawings, the system there shown is in most respects similar to that of FIG. 1 and hence its description will largely be limited to the differences between the two systems. FIG. 2 illustrates an embodiment of the invention wherein a combustion chamber and a means for removing carbon dioxide from the gas stream leaving the secondary reduction zone are provided.

Referring to FIG. 2, the reactor 210 comprises a primary reduction zone 212, secondary reduction zone 214 and a cooling zone 216 similar to the zones 12, 14 and 16 of FIG. 1. The reducing gas is introduced into the reactor through plenum chamber 222 similar to chamber 22 and leaves the reactor through a discharge connection 247. The ore is charged to the reactor through inlet 218 and moves downwardly through the primary reduction zone 212 where it is partially reduced by the hot reducing gas moving upwardly through the primary reduction zone 212. This reduction in the primary reduction zone 212 is similar to that shown in FIG. 1 and the ore leaving zone 212 and entering the secondary reduction zone 214 consists largely of elemental iron, ferric carbide and residual amounts of ferric oxide.

The ore in the secondary reduction zone 214 is further reduced through the solid phase reaction of ferric carbide and ferric oxide in an inert gas atmosphere as in FIG. 1. The substantially inert gas enters the reactor through plenum 230 similar to plenum 30 and flows upwardly through the secondary reduction zone where carbon monoxide is formed by the reduction of the residual ferric oxide. As described in the embodiment of FIG. 1, the inert gas may be supplied to the secondary reduction zone 214 either directly through pipe 280 or by inert gas flowing upwardly from the cooling zone 216. However, reactor 210 differs from reactor 10 in that removal of the effluent gas stream is effected through an annular plenum chamber 400 connected to combustion chamber 402 rather than through the annular plenum chamber 26 into pipe 82 as in reactor 10.

The embodiment of FIG. 2 operates to remove any carbon-containing gases in the inert gas loop so that substantially inert gas can be recycled back to the secondary reduction zone 214. Once the carbon-containing gases are removed from the gas stream there is no further need to continuously supply the inert gas loop with inert make-up gas. In order to achieve removal of the carbon-containing gases in a more efficient way, the carbon monoxide formed by the solid phase reduction reaction in the secondary reduction zone 214 is burned and thereby converted to carbon dioxide in the combustion chamber 402.

The gas stream of carbon monoxide and inert gas moving upwardly through the secondary reduction zone leaves the reactor 210 through annular chamber 400 and enters the combustion chamber 402. Air from a suitable source (not shown) is supplied to the combustion chamber 402 through inlet pipe 404 containing a flow controller 405. The gas entering the combustion chamber is then burned to yield carbon dioxide in addition to the inert gas circulating through the system.

The gas mixture is discharged from the combustion chamber 402 into pipe 406 and then into a quench cooler 408. Water is introduced into the quench cooler 408 through pipe 410 to cool the effluent gas. The gas exits from cooler 408 and flows through pipe 412 into a carbon dioxide absorber 414. The carbon dioxide in the gas stream entering the absorber 414 is removed by a method known in the art and the gas leaving the absorber 414 through pipe 418 contains only small amounts of carbon dioxide.

This gas, which is now substantially inert, flows through pipes 418 and 420 to the junction of pipes 270 and 266. A portion of the gas flows through pipe 266 and then to the cooling system as described in FIG. 1. Another portion of the gas flows through pipe 270 to the suction side of pump 272 and is then recycled back to the secondary reduction zone 214 of the reactor also as described in FIG. 1. The gas flows through pipe 274, heating coil 276 in heater 278, pipe 280 and plenum chamber 230 as it is recycled to the reactor 210.

During normal operation a portion of the gas circulating through the secondary reduction loop will be transferred to the cooling loop through pipe 266. When there is no external source of inert gas available, then gas can be transferred to the cooling loop from the secondary reduction loop both externally through pipes 420 and 266 or internally through the reactor.

Figure 3:
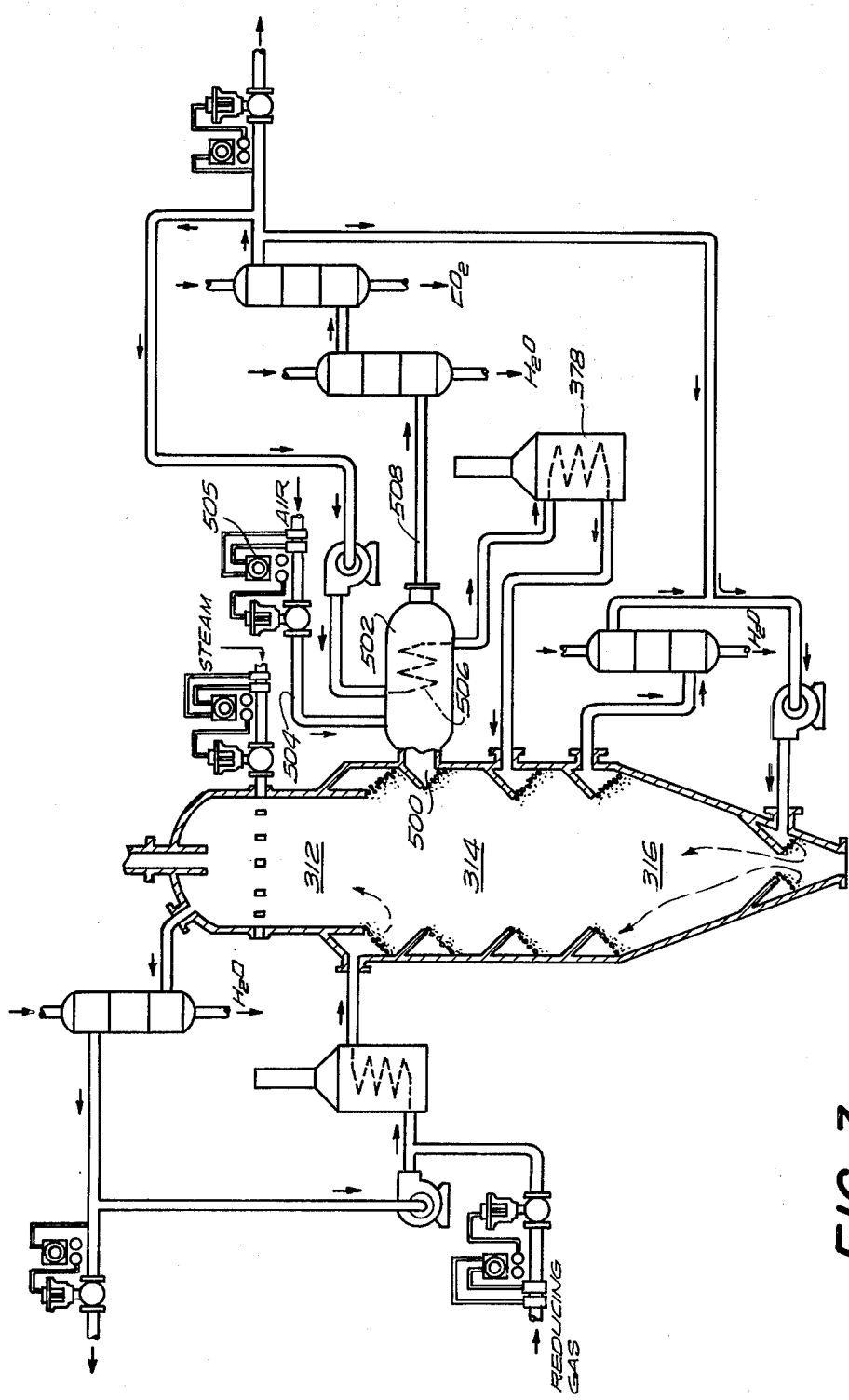
FIG. 3 shows a system generally similar to that shown in FIG. 2 wherein the gas stream recycled to the reactor is passed in heat exchange relationship with the gas stream leaving the secondary reduction zone.

Turning now to the embodiment illustrated in FIG. 3, the system is similar in most respects to that shown in FIG. 2. FIG. 3 is a diagrammatic illustration of a system using a combustion chamber as in FIG. 2 but with the additional feature of passing the gas effluent from the secondary reduction zone in heat exchange relationship with the gas being recycled back to the reactor.

The gas leaving the secondary reduction zone 314 consists of carbon monoxide, formed in the reduction of the residual iron oxide by ferric carbide, and inert gas circulating through the inert gas loop. The gas stream leaves the reactor through plenum chamber 500 and enters the combustion chamber 502 which is similar to combustion chamber 402 of FIG. 2. Air is supplied to the combustion chamber 502 through inlet pipe 504 and the gas entering the chamber is burned. The gas leaves the combustion chamber 502 through pipe 508 and is passed through a quench cooler and a carbon dioxide absorber in a manner described in FIG. 2.

In order to achieve better thermal efficiency in the system, the heat produced in the combustion chamber 502 can be utilized to heat the substantially inert gas being recycled back to the secondary reduction zone. After carbon dioxide has been removed from the gas leaving the combustion chamber, the gas is circulated through heating coil 506 in the combustion chamber 502. It is evident that by using coil 506 the heat supplied by the heater 378 can be decreased by the amount of heat absorbed by the recycle gas passing through the combustion chamber in heat exchange relationship with the gas effluent from the reactor and the desired 500° C. gas temperature can still be achieved. This mode of operation results in improved thermal efficiency. In all other respects the embodiment described in FIG. 3 is similar to that shown in FIGS. 1 and 2.

It is, of course, to be understood that the foregoing description is intended to be illustrative only and that the embodiments described can be modified in various ways within the scope of the invention. For example, the embodiment shown in FIG. 3 wherein the inert gas recycle is passed in heat exchange relationship with the gas effluent from the secondary reduction zone need not include carbon dioxide removal. Inert make-up gas can be supplied to both the inert gas loop and the cooling loop so as to maintain a desired inert gas atmosphere in the secondary reduction zone to aid in the reduction of residual iron oxide.

Further, as pointed out at the beginning of the specification, the present method and apparatus may be used in the reduction of ores other than iron ore, for example, ores of metals such as nickel, copper and tin.

Other modifications within the scope of the invention will be apparent to those skilled in the art.

We claim:

1. A method for reducing a particulate metal ore to metal particles in a vertical shaft, moving bed reactor having a primary reduction zone in the upper portion thereof in which said ore is reduced and carburized by a carbon-containing reducing gas, a cooling zone in the lower portion of said bed for cooling the reduced ore and a secondary reduction zone between said primary reduction zone and said cooling zone which comprises heating a first stream of substantially inert gas to an elevated temperature, feeding the hot first gas stream to said secondary reduction zone near one end thereof, removing from a point near the other end of said secondary reduction zone a second gas stream comprising said inert gas and a reducing gas formed in said secondary reduction zone, cooling said second stream and recycling said second stream to said secondary reduction zone as said first stream.

2. A method according to claim 1 wherein said first gas stream is heated to a temperature of 600° to 900° C.

3. A method according to claim 1 wherein the reduced ore in said cooling zone is cooled by circulating an inert gas therethrough in a loop, make-up inert gas is fed to said cooling loop to cause make-up inert gas to flow upwardly into the secondary reduction zone and a portion of the cooled second stream gas is withdrawn as a vent gas.

4. A method according to claim 1 wherein the inert gas consists essentially of nitrogen.

5. A method for reducing a particulate metal ore to metal particles in a vertical shaft, moving bed reactor having a primary reduction zone in the upper portion thereof in which said ore is reduced and the resulting metal is carburized by a carbon-containing reducing gas, a cooling zone in the lower portion of said bed for cooling the reduced ore and a secondary reduction zone between said primary reduction zone and said cooling zone which comprises heating a first stream of essentially inert gas to an elevated temperature, feeding the hot first gas stream to said secondary reduction zone near one end thereof to cause said gas to flow through said secondary reduction zone, removing from a point near the other end of said secondary reduction zone a second gas stream comprising said inert gas and a reducing gas formed in said secondary reduction zone, mixing said second gas stream with air to cause the reducing components of said second gas stream to be burned and from a third gas stream and cooling and recycling said third stream to said secondary reduction zone as said first stream to form a secondary reduction loop.

6. A method according to claim 5 wherein said first gas stream is heated to a temperature of 600° to 900° C.

7. A method according to claim 5 wherein said first gas stream is heated by passing it in heat exchange relationship to said third stream before said third stream is cooled.

8. A method according to claim 5 wherein the reduced ore in the cooling zone is cooled by circulating an inert cooling gas therethrough in a cooling loop and by transferring a portion of said inert gas from said secondary reduction loop to said cooling loop.

9. A method according to claim 8 wherein a portion of said third gas stream is transferred to said cooling loop.

10. A method according to claim 8 wherein a portion of said first gas stream flows downwardly through said reactor to said cooling loop.

11. A method for reducing a particulate metal ore to metal particles in a vertical shaft, moving bed reactor having a primary reduction zone in the upper portion thereof in which said ore is reduced and carburized by a carbon-containing reducing gas, a cooling zone in the lower portion of said bed for cooling the reduced ore and a secondary reduction zone between said primary reduction zone and said cooling zone which comprises heating a first stream of essentially inert gas to an elevated temperature, feeding the hot first gas stream to said secondary reduction zone at a point near one end thereof to cause said gas to flow through said secondary reduction zone, removing from a point near the other end of said secondary reduction zone a second gas stream comprising said inert gas and a reducing gas formed in said secondary reduction zone, mixing said second gas stream with air to cause the reducing components of said second gas stream to be burned and form a third stream comprising carbon dioxide, cooling said third stream, removing at least a portion of the carbon dioxide content of said cooled third stream to form a fourth gas stream and recirculating said fourth stream to said secondary reduction zone as said first stream.

12. A method according to claim 11 wherein said first gas stream is heated to a temperature of 600° to 900° C.

13. A method according to claim 11 wherein said first gas stream is heated by passing it in heat exchange relationship to said third stream before said third stream is cooled.

14. A method according to claim 11 wherein the reduced ore in the cooling zone is cooled by circulating an inert cooling gas therethrough in a cooling loop and a portion of the fourth stream gas is fed to said cooling loop.

15. Apparatus for reducing a particulate metal ore to metal particles comprising a vertical shaft reactor having a primary reduction zone in the upper portion thereof in which said ore is reduced and carburized by a carbon-containing reducing gas, a cooling zone in the lower portion of said bed for cooling the reduced ore and a secondary reduction zone between said primary reduction zone and said cooling zone, means for supplying heated reducing gas to said reactor near the bottom of said primary reduction zone, means for supplying cooling gas to said reactor near the bottom of said cooling zone, an external conduit connected at one end near the bottom of said secondary reduction zone and connected at its other end near the top of said secondary reduction zone, said external conduit and said secondary reduction zone forming a gas flow loop, a source of inert make-up gas for supplying make-up gas to said external conduit, a heating means in said loop for heating gas entering said reactor and pumping means in said loop for circulating said gas therethrough.

16. Apparatus according to claim 15 wherein said external conduit includes a combustion chamber and a means for supplying air to said combustion chamber to burn carbon monoxide present therein to form carbon dioxide and to introduce nitrogen into said external gas loop.

17. Apparatus according to claim 16 wherein said external conduit includes a means for passing said gas entering the reactor in heat exchange relationship with gas flowing through said combustion chamber.

18. Apparatus according to claim 15 wherein said external conduit includes a means for removing the carbon dioxide from the gas leaving said combustion chamber.

* * * * *